(12) United States Patent
Kabashima et al.

(10) Patent No.: US 12,390,794 B2
(45) Date of Patent: Aug. 19, 2025

(54) EXHAUST GAS PURIFICATION CATALYST

(71) Applicants: Nobusuke Kabashima, Toyota (JP); Tetsuya Shinozaki, Kakegawa (JP)

(72) Inventors: Nobusuke Kabashima, Toyota (JP); Tetsuya Shinozaki, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 231 days.

(21) Appl. No.: 18/177,170

(22) Filed: Mar. 2, 2023

(65) Prior Publication Data

US 2023/0294078 A1    Sep. 21, 2023

(30) Foreign Application Priority Data

Mar. 15, 2022  (JP) ................. 2022-040137

(51) Int. Cl.
| | |
|---|---|
| *B01J 21/04* | (2006.01) |
| *B01D 53/94* | (2006.01) |
| *B01J 23/42* | (2006.01) |
| *B01J 23/44* | (2006.01) |
| *B01J 37/02* | (2006.01) |

(52) U.S. Cl.
CPC .......... *B01J 23/44* (2013.01); *B01D 53/9413* (2013.01); *B01J 21/04* (2013.01); *B01J 23/42* (2013.01); *B01J 37/0244* (2013.01); *B01D 2255/1023* (2013.01); *B01D 2255/9022* (2013.01); *B01D 2258/01* (2013.01)

(58) Field of Classification Search
CPC . B01J 21/04; B01J 23/42; B01J 23/44; B01D 53/9413

USPC .......... 502/332–334, 339, 355, 415, 527.12, 502/527.13
See application file for complete search history.

(56) References Cited

U.S. PATENT DOCUMENTS

| | | | | |
|---|---|---|---|---|
| 5,332,554 A | * | 7/1994 | Yasaki | ................. F01N 13/009 423/220 |
| 5,376,610 A | | 12/1994 | Takahata et al. | |
| 5,494,878 A | * | 2/1996 | Murakami | ........... B01J 37/0244 502/328 |

(Continued)

FOREIGN PATENT DOCUMENTS

| | | |
|---|---|---|
| DE | 69312778 T2 | 1/1998 |
| EP | 1080783 A2 | 3/2001 |

(Continued)

*Primary Examiner* — Cam N. Nguyen
(74) *Attorney, Agent, or Firm* — Oliff PLC (57) ABSTRACT

Provided is an exhaust gas purification catalyst improved in warm-up performance while suppressing HC poisoning of a noble metal in an atmosphere in which an air-fuel ratio (A/F) is rich and the HC poisoning easily occurs. The present disclosure relates to an exhaust gas purification catalyst that includes a substrate and a catalyst coating layer coated on the substrate. The catalyst coating layer includes a lower coating layer coated on the substrate and an upper coating layer coated on the lower coating layer. The lower coating layer contains a noble metal. The upper coating layer contains Pd and/or Pt. The Pd and/or Pt contained in the upper coating layer is supported on $Al_2O_3$ by a certain amount or more. A thickness of the upper coating layer is adjusted.

4 Claims, 8 Drawing Sheets

(56) References Cited

U.S. PATENT DOCUMENTS

| | | | | |
|---|---|---|---|---|
| 5,525,307 | A * | 6/1996 | Yasaki | F01N 13/0097 |
| | | | | 423/220 |
| 7,547,656 | B2 * | 6/2009 | Miura | B01D 53/945 |
| | | | | 502/527.12 |
| 8,258,075 | B2 * | 9/2012 | Nochi | B01J 37/0248 |
| | | | | 502/262 |
| 8,580,706 | B2 * | 11/2013 | Matsueda | B01J 37/0244 |
| | | | | 502/355 |
| 8,828,900 | B2 * | 9/2014 | Takagi | B01J 37/0244 |
| | | | | 502/64 |
| 8,835,349 | B2 * | 9/2014 | Nobukawa | F01N 3/0864 |
| | | | | 502/332 |
| 9,675,970 | B2 * | 6/2017 | Matsueda | B01J 23/63 |
| 9,782,753 | B2 * | 10/2017 | Aoki | B01D 53/9413 |
| 9,833,771 | B2 * | 12/2017 | Goto | B01D 53/945 |
| 10,307,736 | B2 * | 6/2019 | Saito | B01J 21/04 |
| 10,413,885 | B2 * | 9/2019 | Suzuki | F01N 3/28 |
| 10,934,910 | B2 * | 3/2021 | Makino | F01N 3/28 |
| 11,053,833 | B2 * | 7/2021 | Chinzei | F01N 3/2803 |
| 11,364,489 | B2 * | 6/2022 | Makino | B01D 53/944 |
| 11,524,285 | B2 * | 12/2022 | Oishi | B01J 37/0228 |
| 11,559,768 | B2 * | 1/2023 | Chinzei | B01J 35/19 |
| 11,795,855 | B2 * | 10/2023 | Chinzei | B01J 23/464 |
| 2019/0105637 | A1 | 4/2019 | Suzuki et al. | |
| 2020/0276567 | A1 * | 9/2020 | Onoe | B01J 35/19 |
| 2020/0391186 | A1 * | 12/2020 | Shirakawa | B01J 23/10 |
| 2022/0203337 | A1 | 6/2022 | Lee et al. | |

FOREIGN PATENT DOCUMENTS

| | | |
|---|---|---|
| JP | 2001-70790 A | 3/2001 |
| JP | 2010-017694 A | 1/2010 |
| JP | 2011-5443 A | 1/2011 |
| JP | 2019-69402 A | 5/2019 |
| WO | 2020/204571 A1 | 10/2020 |

* cited by examiner

EXHAUST GAS PURIFICATION CATALYST

CROSS REFERENCE TO RELATED APPLICATIONS

The present application claims priority from Japanese patent application JP 2022-040137 filed on Mar. 15, 2022, the entire content of which is hereby incorporated by reference into this application.

BACKGROUND

Technical Field

The present disclosure relates to an exhaust gas purification catalyst.

Description of Related Art

Exhaust gas discharged from an internal combustion engine for an automobile or the like, for example, an internal combustion engine, such as a gasoline engine or a diesel engine, contains harmful components such as carbon monoxide (CO), hydrocarbon (HC), and nitrogen oxide (NOx).

Therefore, generally, an exhaust gas purification device for decomposing and removing these harmful components is disposed in the internal combustion engine, and most parts of these harmful components are detoxified by an exhaust gas purification catalyst attached inside the exhaust gas purification device.

For example, JP 2019-069402 A discloses an exhaust gas purification catalyst that includes a substrate and a catalyst coating layer formed on a surface of the substrate. The catalyst coating layer includes upper and lower layers, one close to the substrate surface is the lower layer and one relatively remote from the substrate surface is the upper layer. The upper layer of the catalyst coating layer contains Rh, Pd, and a carrier. The upper layer of the catalyst coating layer includes an uppermost surface Pd layer having a Pd concentration relatively higher than that in any other portion in the upper layer within an area extending over a length of 20 mm or more from one end on the upstream side in the downstream direction on the surface of the upper layer. The lower layer of the catalyst coating layer contains at least one noble metal selected from Pd and Pt, and a carrier. 60 mass % or more of Pd contained in the uppermost surface Pd layer exists in a layer up to 50% of the upper layer in a thickness direction from the surface of the uppermost surface Pd layer being relatively remote from the surface of the substrate.

SUMMARY

The amount of the noble metal contained in each catalyst coating layer is desired to be reduced from the aspect of resource risk. For reducing the amount of the noble metal, it is only necessary to avoid reduction of catalytic activity of the noble metal due to the use of the exhaust gas purification catalyst, and for avoiding the reduction of the catalytic activity of the noble metal, it is included to suppress poisoning (HC poisoning) of the noble metals by HC in the exhaust gas, which is one of the causes of the reduction of the catalytic activity of the noble metal.

Meanwhile, the exhaust gas purification catalyst requires a satisfactory warm-up performance, that is, exhaust gas purification in the beginning of the exhaust gas purification (for example, immediately after starting the engine).

In the exhaust gas purification catalyst of JP 2019-069402 A, it is attempted to improve the HC conversion performance and the warm-up performance by increasing the Pd concentration in the upper layer in the structure including the two layers of catalyst coating layers containing the noble metal as the catalyst metal on the substrate. However, in JP 2019-069402 A, a carrier supporting Pd is not specified, and there is a room for improving the Pd usage efficiency due to the HC poisoning of Pd.

Accordingly, the present disclosure provides an exhaust gas purification catalyst improved in warm-up performance while suppressing HC poisoning of a noble metal in an atmosphere in which an air-fuel ratio (A/F) is rich and the HC poisoning easily occurs.

The catalyst coating layers usually have respective functions of converting mutually different harmful components. Therefore, when an exhaust gas purification catalyst includes a substrate, a lower coating layer coated on the substrate, and an upper coating layer coated on the lower coating layer, it is desired that the upper coating layer has a structure in which the lower coating layer and the exhaust gas containing a harmful component can promptly contact one another, that is, a structure excellent in gas diffusivity.

Thus, the inventors examined various means to solve the problem, and found the following. In an exhaust gas purification catalyst including a substrate and a catalyst coating layer coated on the substrate, a lower coating layer coated on the substrate, and an upper coating layer coated on the lower coating layer are disposed as catalyst coating layers. A noble metal is introduced in the lower coating layer, and palladium (Pd) and/or platinum (Pt) supported on alumina ($Al_2O_3$) are introduced in the upper coating layer, and further, a thickness of the upper coating layer is adjusted. This allows, first, HC in an exhaust gas to be efficiently converted by Pd and/or Pt supported on $Al_2O_3$ having a high HC poisoning resistance in the upper coating layer that the exhaust gas contacts at first, and subsequently, the exhaust gas in which HC has been converted can be promptly and efficiently purified in the lower coating layer after passing through the upper coating layer in which the gas diffusivity has been improved by adjusting the thickness. Thus, the inventors achieved the present disclosure.

That is, the gist of the present disclosure is as follows.

(1) An exhaust gas purification catalyst comprises a substrate and a catalyst coating layer coated on the substrate. The catalyst coating layer includes a lower coating layer coated on the substrate and an upper coating layer coated on the lower coating layer. The lower coating layer contains a noble metal. The upper coating layer contains Pd and/or Pt. The Pd and/or Pt contained in the upper coating layer is supported on $Al_2O_3$ by 80 weight % (% by weight) or more of a total weight of the Pd and/or Pt contained in the upper coating layer. A ratio of a thickness of the upper coating layer to a thickness of the lower coating layer (upper coating layer/lower coating layer) is 0.2 or less.

(2) In the exhaust gas purification catalyst according to (1), the Pd and/or Pt contained in the upper coating layer is supported on $Al_2O_3$ by 90 weight % or more of the total weight.

(3) In the exhaust gas purification catalyst according to (1) or (2), the Pd and/or Pt contained in the upper coating layer is supported on $Al_2O_3$ by 95 weight % or more of the total weight.

(4) In the exhaust gas purification catalyst according to any one of (1) to (3), the thickness of the upper coating layer is 20 μm or less.

The present disclosure provides the exhaust gas purification catalyst improved in warm-up performance while suppressing HC poisoning of the noble metal in the atmosphere in which the air-fuel ratio (A/F) is rich and the HC poisoning easily occurs.

DETAILED DESCRIPTION OF THE EMBODIMENTS

The following describes embodiments of the present disclosure in detail.

In the description, features of the present disclosure will be described with reference to the drawings as necessary. In the drawings, dimensions and shapes of respective components are exaggerated for clarification, and actual dimensions and shapes are not accurately illustrated. Accordingly, the technical scope of the present disclosure is not limited to the dimensions or the shapes of respective components illustrated in the drawings. Note that, an exhaust gas purification catalyst of the present disclosure is not limited to the embodiments bellow, and can be performed in various configurations where changes, improvements, and the like which a person skilled in the art can make are given without departing from the gist of the present disclosure.

The present disclosure relates to an exhaust gas purification catalyst including a substrate and a catalyst coating layer coated on the substrate. The catalyst coating layer includes a lower coating layer coated on the substrate and an upper coating layer coated on the lower coating layer. The lower coating layer contains a noble metal. The upper coating layer contains Pd and/or Pt. The Pd and/or Pt contained in the upper coating layer is supported on $Al_2O_3$ by a certain amount or more. A thickness of the upper coating layer is adjusted.

(Substrate)

For the substrate, a known substrate having a honeycomb shape can be used, specifically, a monolith substrate having a honeycomb shape (for example, a honeycomb filter and a high-density honeycomb) and the like are employed in some embodiments. The material of such a substrate is not specifically limited, and a substrate made of ceramic, such as cordierite, silicon carbide, silica, alumina, and mullite, and a substrate made of metal, such as stainless-steel including chromium and aluminum are employed in some embodiments. Among these, the cordierite is used in some embodiments from the aspect of cost.

(Catalyst Coating Layer)

The catalyst coating layer includes at least the lower coating layer coated on the substrate and the upper coating layer coated on the lower coating layer.

The lower coating layer is coated on the substrate.

The lower coating layer may be formed by a single layer, or may be formed by a plurality of layers, that is, two layers, three layers, or four layers or more. When the lower coating layer includes a plurality of layers, compositions and structures of the respective layers are not specifically limited. Furthermore, the lower coating layer does not necessarily need to be uniform over the whole substrate of the exhaust gas purification catalyst, and may have different compositions and structures between regions in an upstream side and a downstream side in an exhaust gas flow direction.

While a thickness of the lower coating layer (when the lower coating layer includes a plurality of layers, it is a thickness of the whole lower coating layer) is not limited insofar as a ratio of the thickness of the upper coating layer to the thickness of the lower coating layer (upper coating layer/lower coating layer) described below is satisfied, the thickness of the lower coating layer is ordinarily 20 μm to 100 μm in some embodiments, or may be 30 μm to 80 μm. In this description and the like, the thickness means an average thickness, for example, an average value of the thicknesses at randomly selected 10 positions in an image of the coating layer by SEM or TEM.

The thickness of the lower coating layer within the range enables to improve a contact frequency of catalyst metals included in the lower coating layer with a harmful component in the exhaust gas, such as NOx while suppressing an aggregation between the catalyst metals caused by an excessively thin thickness, for example, an aggregation of the catalyst metals caused by a densification of the catalyst metals, and thus enabling an improved exhaust gas purification performance. Furthermore, a balance between a pressure loss, a catalyst performance, and durability in the exhaust gas purification catalyst can be properly kept.

The upper coating layer is coated on the lower coating layer.

While a thickness of the upper coating layer is not limited insofar as the ratio of the thickness of the upper coating layer to the thickness of the lower coating layer (upper coating layer/lower coating layer) described below is satisfied, the thickness of the upper coating layer is ordinarily 20 μm or less, 1 μm to 20 μm in some embodiments, or may be 1 μm to 10 μm.

The thickness of the upper coating layer within the range enables suppressing reduction of gas diffusivity of the exhaust gas caused by the excessively thick thickness and improving a contact frequency of the exhaust gas with the lower coating layer after the exhaust gas passes through the upper coating layer, and thus enabling promptly and efficiently converting the harmful component, such as NOx, in the exhaust gas that has failed to be converted in the upper coating layer in the lower coating layer.

Since the catalyst coating layer includes the lower coating layer and the upper coating layer, the conversion of HC in the upper coating layer and the conversion of NOx in the lower coating layer can be efficiently performed.

The ratio of the thickness of the upper coating layer to the thickness of the lower coating layer (upper coating layer/lower coating layer) is 0.2 or less, or may be 0.01 to 0.16.

The ratio of the thickness of the upper coating layer to the thickness of the lower coating layer (upper coating layer/lower coating layer) within the range enables efficiently performing the conversion of HC and the conversion of NOx in a rich atmosphere.

(Lower Coating Layer)

The lower coating layer contains a noble metal as a catalyst metal.

Examples of the noble metal include catalyst metals generally used in the technical field of exhaust gas purification catalyst, and the noble metal is not limited insofar as the harmful component with reduced HC contained in the exhaust gas that has passed through the upper coating layer can be converted. Examples of the noble metal include at least one selected from the group consisting of rhodium (Rh), Pt, Pd, aurum (Au), argentum (Ag), iridium (Ir), osmium (Os), and ruthenium (Ru). For the noble metal, Rh capable of efficiently converting NOx is used in some embodiments.

The lower coating layer containing the noble metal enables sufficiently providing the NOx conversion performance under an atmosphere in which HC has been sufficiently converted in the upper coating layer without HC poisoning of the noble metal, especially Rh or the like easily poisoned by HC.

While a content of the noble metal contained in the lower coating layer is not limited, the content of the noble metal contained in the lower coating layer is ordinarily 0.05 g to 1.0 g in some embodiments, or may be 0.2 g to 0.8 g in terms of metal of the noble metal relative to the substrate capacity of 1 L. The content of the noble metal optionally contained in the lower coating layer depends on an addition amount of a noble metal precursor (excluding components to be volatilized) as a material in manufacturing the exhaust gas purification catalyst.

The lower coating layer containing the noble metal by the above-described amount enables efficiently and sufficiently converting the harmful component other than HC, especially NOx that has failed to be converted in the upper coating layer under an atmosphere in which HC has been sufficiently converted in the upper coating layer.

While the noble metal contained in the lower coating layer functions as the catalyst metal of the exhaust gas purification catalyst as it is, the noble metal contained in the lower coating layer may be supported on carrier particles.

Therefore, the lower coating layer may further contain carrier particles. Examples of the carrier particles include any metal oxide generally used in the technical field of exhaust gas purification catalyst, for example, silica ($SiO_2$), magnesium oxide (MgO), zirconia ($ZrO_2$), ceria ($CeO_2$), alumina ($Al_2O_3$), titania ($TiO_2$), yttria ($Y_2O_3$), neodymium oxide ($Nd_2O_3$), lanthanum oxide ($La_2O_3$), and their composite oxides and solid solutions, for example, $Al_2O_3$—$CeO_2$—$ZrO_2$ composite oxide (ACZ), $CeO_2$—$ZrO_2$ composite oxide (CZ), and $Al_2O_3$—$ZrO_2$ composite oxide (AZ), combinations of two or more of them, and the like. Proportions of the respective oxides in the composite oxide such as ACZ, CZ and AZ are not limited, and the proportions generally used in the technical field of exhaust gas purification catalyst may be employed.

An acidic carrier, for example, $SiO_2$ has good compatibility with catalyst metal that reduces NOx. A basic carrier, for example, MgO has good compatibility with potassium (K) and barium (Ba) that store NOx. $ZrO_2$ can suppress sintering of other carrier particles under a high temperature where the other carrier particles are sintered and generate $H_2$ by generating a steam reforming reaction to efficiently reduce NOx by, for example, combining with Rh as a catalyst metal. An acid-base amphoteric carrier, for example, $Al_2O_3$ has a high specific surface area, and therefore, this can be used for efficiently storing and reducing NOx. $TiO_2$ can provide an effect to suppress sulfur poisoning of catalyst metal. ACZ and CZ can keep the oxygen concentration constant even when the air-fuel ratio varies as a material (OSC material) having an oxygen storage capacity (OSC: Oxygen Storage Capacity), thus enabling keeping the purification performance of the exhaust gas purification catalyst. By addition, $Al_2O_3$, $ZrO_2$, and other metal oxides can enhance durability of a carrier.

It should be understood that, with the property of the carrier particles, there lies a possibility of improving the exhaust gas purification performance of the exhaust gas purification catalyst of the present disclosure, in particular, a NOx conversion performance depending on the type, the composition, the combination and its proportion, and/or the amount of the selected carrier particles.

When the noble metal is supported by the carrier particles, a contact surface between the exhaust gas and the noble metal can be enlarged since the specific surface area of the carrier particles is large. This enables to improve the performance of the exhaust gas purification catalyst.

For a supporting method of the noble metal to the carrier particles, a generally used method in the technical field of the exhaust gas purification catalyst can be used.

While a content of the carrier particles in the lower coating layer is not limited, the content of the carrier particles in the lower coating layer is ordinarily 25 g to 170 g in some embodiments, or may be 100 g to 140 g relative to the substrate capacity of 1 L. The content of the carrier particles optionally contained in the lower coating layer depends on an addition amount of the carrier particles as a material in manufacturing the exhaust gas purification catalyst.

While the lower coating layer contains the noble metal and optionally contains the carrier particles supporting the noble metal, the lower coating layer may further contain another component as long as the other component does not impair the effect of the present disclosure. Examples of the other component include other metal oxides, additives, and the like used for the catalyst coating layer of this type of usage, specifically, one or more of an alkali metal such as potassium (K), sodium (Na), lithium (Li), and cesium (Cs), an alkaline earth metal such as barium (Ba) and strontium (Sr), a rare earth element such as lanthanum (La), yttrium (Y), and cerium (Ce), a transition metal such as iron (Fe), a metal oxide included in the carrier particles (that is, metal oxide not supporting a noble metal), and the like. The other component may be used as it is, and may be supported on the carrier particles similarly to the noble metal.

While a content of the other component in the lower coating layer is not limited, the content of the other component in the lower coating layer is ordinarily 20 g to 120 g in some embodiments, or may be 80 g to 120 g relative to the substrate capacity of 1 L. The content of the other component optionally contained in the lower coating layer depends on an addition amount of the other component (excluding components to be volatilized) as a material in manufacturing the exhaust gas purification catalyst.

The noble metal contained in the lower coating layer may be present to be uniformly dispersed in the lower coating layer (for example, the noble metal is uniformly supported on all the materials constituting the lower coating layer), or may be locally unevenly distributed (for example, the noble metal is supported on only specific carrier particles among the materials constituting the lower coating layer).

While a coat amount of the lower coating layer is not limited, the coat amount of the lower coating layer is ordinarily 45 g to 250 g in some embodiments, or may be 160 g to 250 g relative to the substrate capacity of 1 L. The coat amount of the lower coating layer depends on a gross weight of the materials (excluding components to be volatilized) in manufacturing the exhaust gas purification catalyst.

The amounts of the materials (coat amounts) in the lower coating layer within the respective ranges enables properly keeping a balance between a pressure loss, a catalyst performance, and durability in the exhaust gas purification catalyst.

(Upper Coating Layer)

The upper coating layer contains Pd and/or Pt as the catalyst metal.

Since the upper coating layer contains Pd and/or Pt, the exhaust gas, especially HC, immediately after being discharged from an engine or the like contacts Pd and/or Pt, thereby enabling the improved performance of converting HC in the exhaust gas.

While a content (total weight) of the Pd and/or Pt contained in the upper coating layer is not limited, the content (total weight) of the Pd and/or Pt contained in the upper coating layer is ordinarily 0.2 g to 5.0 g in some embodiments, or may be 2.0 g to 5.0 g in terms of metal of the catalyst metal relative to the substrate capacity of 1 L. The content of the Pd and/or Pt contained in the upper coating layer depends on an addition amount of a precursor of Pd and/or Pt (excluding components to be volatilized) as a material in manufacturing the exhaust gas purification catalyst.

The upper coating layer containing Pd and/or Pt by the above-described amount enables improved ignitability with a higher density of Pd and/or Pt, thereby enabling the improved conversion performance of the exhaust gas, especially HC.

The upper coating layer further contains $Al_2O_3$ for supporting Pd and/or Pt contained in the upper coating layer.

While the type or the size of $Al_2O_3$ supporting Pd and/or Pt contained in the upper coating layer is not limited, the average particle size is 5 μm or less in some embodiments.

Since the upper coating layer contains $Al_2O_3$, the HC poisoning resistance of Pd and/or Pt supported on $Al_2O_3$ can be improved.

While a content of $Al_2O_3$ supporting Pd and/or Pt contained in the upper coating layer is not limited, the content of $Al_2O_3$ supporting Pd and/or Pt contained in the upper coating layer is ordinarily 5 g to 40 g in some embodiments, or may be 10 g to 30 g relative to the substrate capacity of 1 L. The content of $Al_2O_3$ supporting Pd and/or Pt contained in the upper coating layer depends on an addition amount of $Al_2O_3$ for supporting Pd and/or Pt as a material in manufacturing the exhaust gas purification catalyst.

The upper coating layer containing $Al_2O_3$ by the above-described amount enables sufficiently improving the HC poisoning resistance of Pd and/or Pt supported on $Al_2O_3$ while improving the HC conversion performance by the improved ignitability with a higher density of Pd and/or Pt.

Pd and/or Pt contained in the upper coating layer is supported on $Al_2O_3$ by 80 weight % or more of its total weight. In one embodiment, Pd and/or Pt contained in the upper coating layer is supported on $Al_2O_3$ by 90 weight % or more of its total weight. In one embodiment, Pd and/or Pt contained in the upper coating layer is supported on $Al_2O_3$ by 95 weight % or more of its total weight. In one embodiment, Pd and/or Pt contained in the upper coating layer is supported on $Al_2O_3$ by 99 weight % or more of its total weight. In one embodiment, Pd and/or Pt contained in the upper coating layer is supported on $Al_2O_3$ by almost 100 weight % of its total weight.

For a supporting method of Pd and/or Pt to $Al_2O_3$, a generally used method in the technical field of the exhaust gas purification catalyst can be used. For the supporting method of Pd and/or Pt to $Al_2O_3$, for example, a method in which Pd and/or Pt, $Al_2O_3$, and a solvent, for example, water are stirred and mixed in a container, the obtained mixture is optionally filtered, and further dried and fired can be used.

Since the most part of Pd and/or Pt contained in the upper coating layer is supported on $Al_2O_3$, Pd and/or Pt can efficiently convert HC while suppressing the HC poisoning by $Al_2O_3$ excellent in HC poisoning resistance.

The upper coating layer may further contain another component in addition to Pd and/or Pt and $Al_2O_3$ supporting Pd and/or Pt as long as the other component does not impair the effect of the present disclosure. Examples of the other component include noble metals other than Pd and/or Pt generally used in the technical field of exhaust gas purification catalyst, specifically, at least one selected from the group consisting of Rh, Au, Ag, Ir, Os, and Ru (the noble metal also may be supported on $Al_2O_3$ excellent in HC poisoning resistance), an metal oxide, such as $SiO_2$, MgO, $ZrO_2$, $CeO_2$, $TiO_2$, $Y_2O_3$, $Nd_2O_3$, $La_2O_3$, and $Al_2O_3$ not supporting Pd and/or Pt, and their composite oxides or solid solutions, such as ACZ, CZ, and AZ, and combinations or the like of two or more of them, and one or more of an alkali metal, an alkaline earth metal, a rare earth element, and a transition metal. The other component may be used as it is, and may be supported on the carrier particles.

While a content of the other component in the upper coating layer is not limited, the content of the other component in the upper coating layer is ordinarily 5 g to 20 g in some embodiments, or may be 10 g to 20 g relative to the substrate capacity of 1 L. The content of the other component optionally contained in the upper coating layer depends on an addition amount of the other component (excluding components to be volatilized) as a material in manufacturing the exhaust gas purification catalyst.

While a coat amount of the upper coating layer is not limited, the coat amount of the upper coating layer is ordinarily 5 g to 60 g, 10 g to 60 g in some embodiments, or may be 20 g to 60 g relative to the substrate capacity of 1 L. The coat amount of the upper coating layer depends on a gross weight of the materials (excluding components to be volatilized) in manufacturing the exhaust gas purification catalyst.

The amounts (coat amounts) of the materials in the upper coating layer within the respective ranges enable improving the gas diffusivity in the upper coating layer, further improving the warm-up performance with the improved contact frequency of the exhaust gas with the lower coating layer, and improving the purification performance of the exhaust gas, especially HC by the improved ignitability with the higher density of Pd and/or Pt and the conversion performance of the harmful component other than HC, for example, NOx by the noble metal contained in the lower coating layer.

The upper coating layer may consist of Pd and/or Pt and $Al_2O_3$ supporting Pd and/or Pt.

When the upper coating layer consists of Pd and/or Pt and $Al_2O_3$ supporting Pd and/or Pt, HC in the exhaust gas can be efficiently converted by Pd and/or Pt while avoiding the HC poisoning, and further, the exhaust gas in which HC has been converted can be efficiently purified in the lower coating layer while promptly guiding the exhaust gas in which HC has been converted to the lower coating layer disposed under the upper coating layer.

(Method for Manufacturing Exhaust Gas Purification Catalyst)

The exhaust gas purification catalyst of the present disclosure can be manufactured using a known coating technique except that the above-described components of the exhaust gas purification catalyst are used.

For example, the exhaust gas purification catalyst of the present disclosure can be manufactured as follows. First, in the region where the lower coating layer is formed on the substrate, a catalyst coating layer slurry for the lower coating layer including materials constituting the lower coating layer, for example, a catalyst metal precursor, for example, a salt, such as, nitrate, including Rh, a solvent (for example, water, alcohol, and a mixture of water and alcohol) and optionally carrier particles, for example, of alumina-ceria-zirconia complex oxide and/or ceria-zirconia complex oxide, additives, for example, a thickener, are coated by a suction method. After blowing off extra slurry with a blower or the like, for example, it is dried for usually one hour to three hours at usually 100° C. to 150° C. in the atmosphere to remove the solvent, and is fired for usually one hour to three hours at usually 450° C. to 550° C. in the atmosphere to form the lower coating layer. Subsequently, on the lower coating layer on the substrate where the lower coating layer has been formed, a catalyst coating layer slurry for the upper coating layer including materials constituting the upper coating layer, that is, a precursor of Pd and/or Pt, for example, a salt, such as, nitrate, including Pd and/or Pt, $Al_2O_3$, a solvent (for example, water, alcohol, and a mixture of water and alcohol), and optionally additives, for example, a thickener, are coated by a suction method. After blowing off extra slurry with a blower or the like, for example, it is dried for usually one hour to three hours at usually 100° C. to 150° C. in the atmosphere to remove the solvent, and is fired for usually one hour to three hours at usually 450° C. to 550° C. in the atmosphere to form the upper coating layer.

(Applicability of Exhaust Gas Purification Catalyst)

The exhaust gas purification catalyst of the present disclosure can significantly provide the effect in an exhaust gas purification performance in the rich atmosphere, and can be used as an exhaust gas purification catalyst that exhibits a high HC poisoning suppression effect and is excellent in warm-up performance that can be used even under an environment where the exhaust gas purification catalyst could be possibly poisoned by adsorbing the excess HC and the like in the rich atmosphere to the exhaust gas purification catalyst.

EXAMPLES

While the following describes some Examples regarding the present disclosure, it is not intended to limit the present disclosure to those described in such Examples.

1. Preparation of Exhaust Gas Purification Catalyst

Comparative Example 1

(1) First, $Al_2O_3$—$CeO_2$—$ZrO_2$ composite oxide ($Al_2O_3$: 30 wt %, $CeO_2$: 20 wt %, $ZrO_2$: 50 wt %), $Al_2O_3$—$ZrO_2$ composite oxide ($Al_2O_3$: 30 wt %, $ZrO_2$: 70 wt %), $Al_2O_3$, $Al_2O_3$ binder, a thickener (hydroxyethyl cellulose), an organic fiber, and rhodium nitrate were put in water while stirring them, and by further stirring and mixing them, a catalyst coating layer slurry for the lower coating layer was prepared.

(2) Next, the catalyst coating layer slurry for the lower coating layer was poured into a substrate (honeycomb substrate of 875 cc (600 cells, hexagon, wall thickness of 2.5 mil) manufactured by NGK) by a suction method, and the materials were applied over the substrate wall surface, thus preparing a precursor layer of the lower coating layer. At that time, for each coating material, $Al_2O_3$—$CeO_2$—$ZrO_2$ composite oxide was 99 g (99 g/L), $Al_2O_3$—$ZrO_2$ composite oxide was 41 g (41 g/L), $Al_2O_3$ was 45 g (45 g/L), Rh was 0.40 g (0.46 g/L) in terms of metal, relative to the substrate capacity of 1 L. The precursor layer of the lower coating layer was applied from an end portion in the upstream side to an end portion in the downstream side in the exhaust gas flow direction of the exhaust gas purification catalyst, that is, applied over the whole length of the substrate of the exhaust gas purification catalyst.

(3) The water content of the substrate over which the precursor layer of the lower coating layer was applied was removed for two hours by a dryer kept at 120° C., and subsequently, firing was performed for two hours by an electric furnace kept at 500° C., thereby preparing the lower coating layer.

(4) Subsequently, an aqueous solution of palladium nitrate was absorbed in an outermost surface of the lower coating layer of the substrate including the lower coating layer. At that time, Pd was 0.24 g (0.28 g/L) in terms of metal relative to the substrate capacity of 1 L. Subsequently, the water content of the substrate in which Pd was supported on the lower coating layer was removed for two hours by a dryer kept at 120° C., and subsequently, firing was performed for two hours by an electric furnace kept at 500° C., thereby preparing the exhaust gas purification catalyst.

Comparative Example 2

The exhaust gas purification catalyst was prepared similarly to Comparative Example 1 except that the process (4) of Comparative Example 1 was changed to processes (4') and (5') below.

(4') Subsequently, an aqueous solution of palladium nitrate was absorbed in an outermost surface of the lower coating layer of the substrate including the lower coating layer. At that time, Pd was 0.06 g (0.07 g/L) in terms of metal relative to the substrate capacity of 1 L. Subsequently, the water content of the substrate in which Pd was supported on the lower coating layer was removed for two hours by a dryer kept at 120° C., and subsequently, firing was performed for two hours by an electric furnace kept at 500° C.

(5') The process (4') was repeatedly performed four times, thereby preparing the exhaust gas purification catalyst. In the exhaust gas purification catalyst, Pd was finally 0.24 g (0.28 g/L) in terms of metal relative to the substrate capacity of 1 L.

Example 1

The exhaust gas purification catalyst was prepared similarly to Comparative Example 1 except that the process (4) of Comparative Example 1 was changed to processes (4") to (6") below.

(4") Subsequently, $Al_2O_3$, the thickener (hydroxyethyl cellulose), and palladium nitrate were put into water while stirring them, and by further stirring and mixing them, a catalyst coating layer slurry for the upper coating layer was prepared.

(5") Next, the catalyst coating layer slurry for the upper coating layer was poured on the lower coating layer of the substrate including the lower coating layer by the suction method similarly to the catalyst coating layer slurry for the lower coating layer, the materials were applied over the lower coating layer of the substrate, thus preparing a precursor layer of the upper coating layer. At that time, for each coating material, $Al_2O_3$ was 5.25 g (6.0 g/L) and Pd was 0.24 g (0.28 g/L) in terms of metal, relative to the substrate capacity of 1 L. The precursor layer of the upper coating layer was applied from an end portion in the upstream side to an end portion in the downstream side in the exhaust gas flow direction of the exhaust gas purification catalyst, that is, applied over the whole length of the substrate of the exhaust gas purification catalyst.

(6") The water content of the substrate over which the precursor layer of the upper coating layer was applied was removed for two hours by a dryer kept at 120° C., and subsequently, firing was performed for two hours by an electric furnace kept at 500° C., thereby preparing the upper coating layer. Thus, the exhaust gas purification catalyst was prepared.

2. Electron Probe Microanalyzer (EPMA) Analysis

Figure 1:
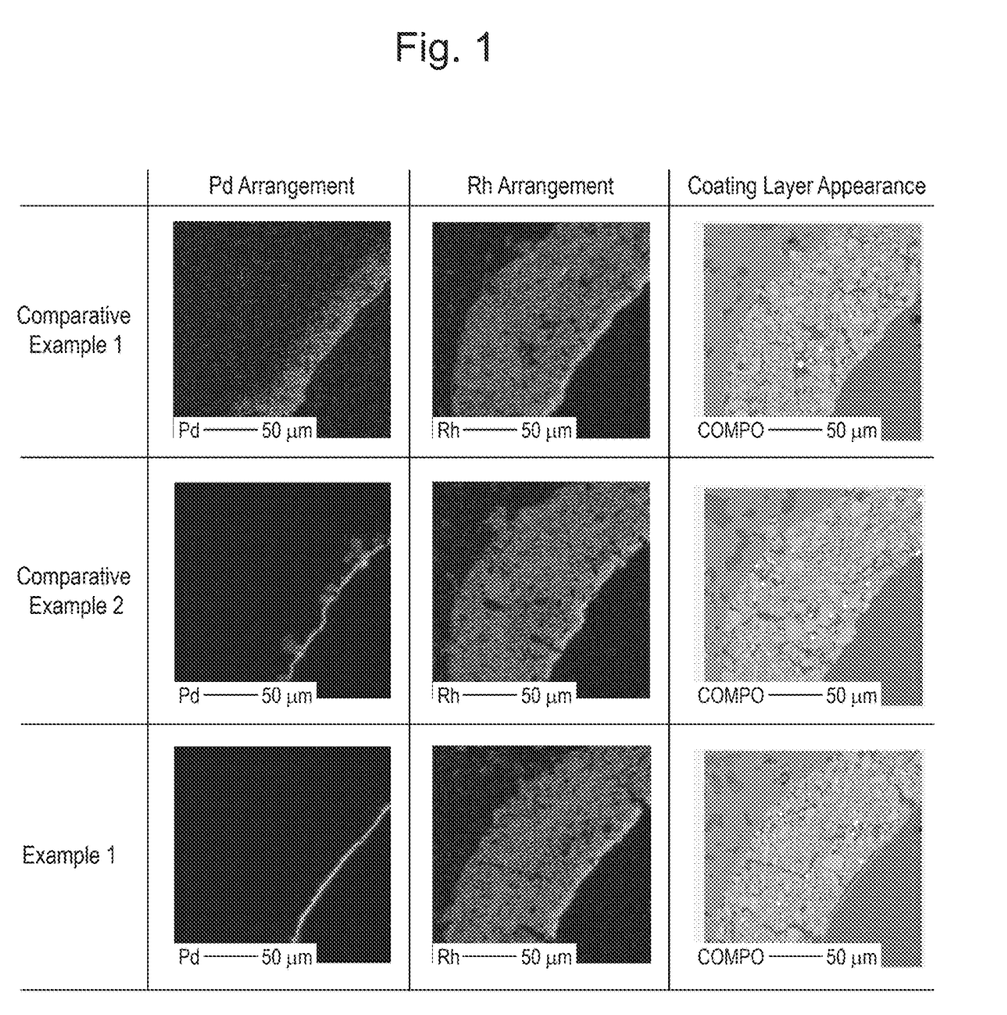
FIG. 1 is a photograph illustrating a Pd arrangement, a Rh arrangement, and an appearance of a catalyst coating layer by EPMA for catalyst coating layers of exhaust gas purification catalysts of Comparative Examples 1 and 2 and Example 1.

Surfaces of the exhaust gas purification catalysts of Comparative Examples 1 and 2 and Example 1 were analyzed by EPMA. FIG. 1 illustrates the result.

It was found from FIG. 1 that the thicknesses of the catalyst coating layers (lower coating layers) were about 100 μm in Comparative Examples 1 and 2 and Example 1. Furthermore, it was found that in Comparative Example 1, Rh was uniformly present in the whole catalyst coating layer, and Pd was present only close to the superficial layer of the catalyst coating layer. It was also found that in Comparative Example 2, Rh was uniformly present in the whole catalyst coating layer, and Pd was present only close to the superficial layer of the catalyst coating layer, especially only close to the superficial layer compared with Comparative Example 1. Additionally, it was found that in Example 1, Rh was uniformly present in the whole catalyst coating layer, and Pd was present only close to the outermost layer of the catalyst coating layer, especially only in a range of about 5 μm from the outermost layer (that is, in the exhaust gas purification catalyst of Example 1, the thickness of the upper coating layer was about 5 μm). In the catalyst coating layers of Comparative Examples 1 and 2, a distinction between the lower coating layer and the upper coating layer was not clear in the catalyst coating layer. This is caused by the formation method of the catalyst coating layer in Comparative Examples 1 and 2.

Figure 2:
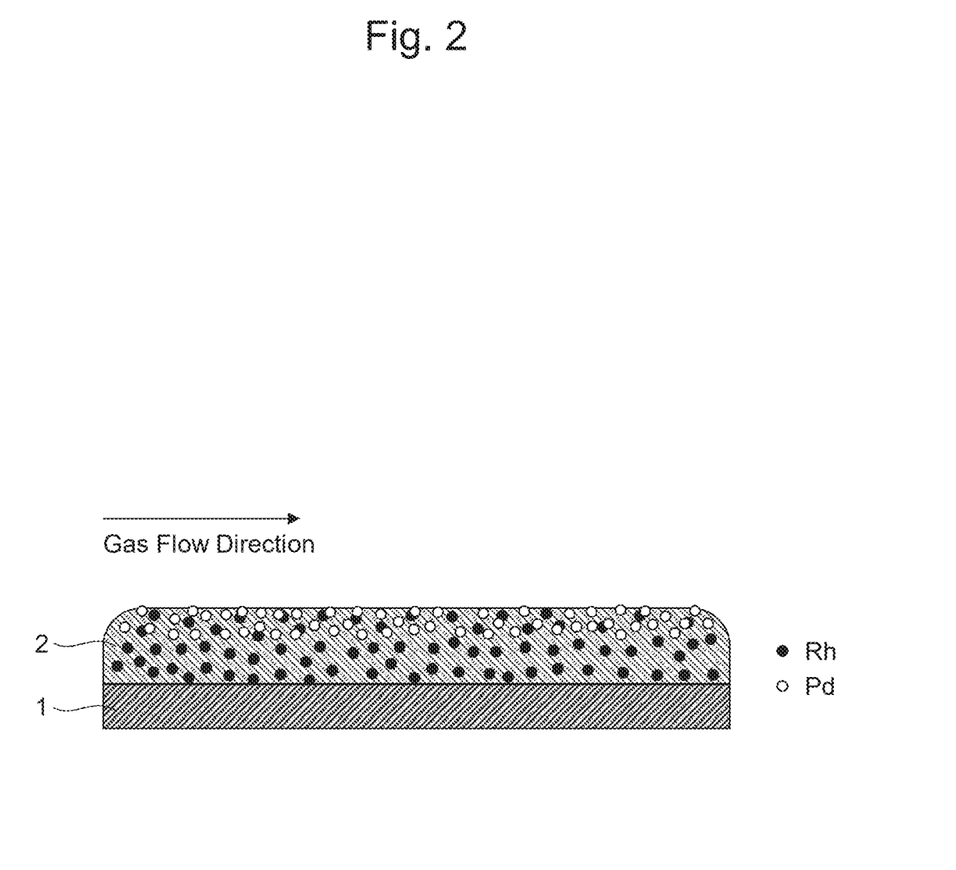
FIG. 2 is a drawing schematically illustrating embodiments of the catalyst coating layer of Comparative Examples 1 and 2.
Figure 3:
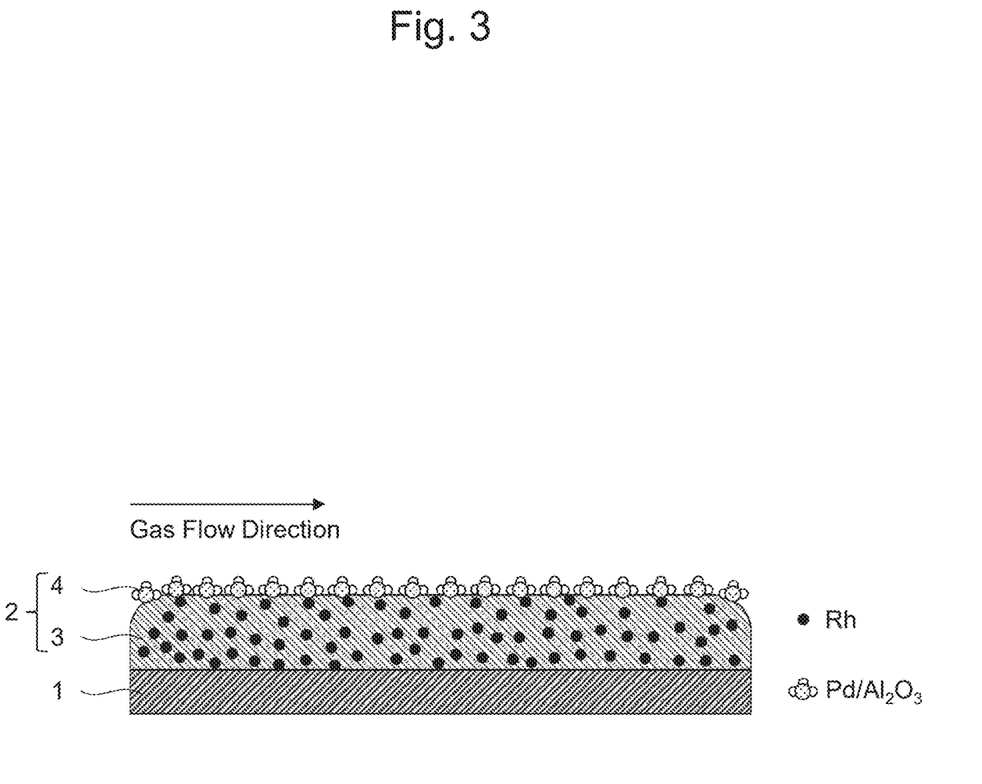
FIG. 3 is a drawing schematically illustrating an embodiment of the catalyst coating layer of Example 1.

FIG. 2 schematically illustrates embodiments of a catalyst coating layer 2 of Comparative Examples 1 and 2, and FIG. 3 schematically illustrates an embodiment of the catalyst coating layer 2 of Example 1.

In FIG. 2, the catalyst coating layer 2 of Comparative Examples 1 and 2 is formed on a substrate 1. Rh in the catalyst coating layer 2 of Comparative Examples 1 and 2 is uniformly present over the whole catalyst coating layer 2. Meanwhile, Pd in the catalyst coating layer 2 of Comparative Examples 1 and 2 is present only close to the superficial layer of the catalyst coating layer 2. In the catalyst coating layer 2 of Comparative Examples 1 and 2, Pd is not necessarily supported on only specific carrier particles, for example, alumina.

In FIG. 3, the catalyst coating layer 2 of Example 1 is formed on the substrate 1. The catalyst coating layer 2 of Example 1 consists of a lower coating layer 3 formed on the substrate 1 and an upper coating layer 4 formed on the lower coating layer 3. Rh in the catalyst coating layer 2 of Example 1 is uniformly present over the whole lower coating layer 3. Meanwhile, Pd in the catalyst coating layer 2 of Example 1 is supported on $Al_2O_3$, and present only in the upper coating layer 4.

3. Durability Test

The following durability test was performed using an actual engine for the exhaust gas purification catalysts of Comparative Examples 1 and 2 and Example 1.

The test was performed by mounting each of the exhaust gas purification catalysts on an exhaust system of V8 engine and repeatedly flowing exhaust gases in respective atmospheres of stoichiometric and lean at each certain period of time (ratio of 3:1) at a catalyst bed temperature of 950° C. and over 50 hours.

4. Engine Bench Evaluation

Figure 4:
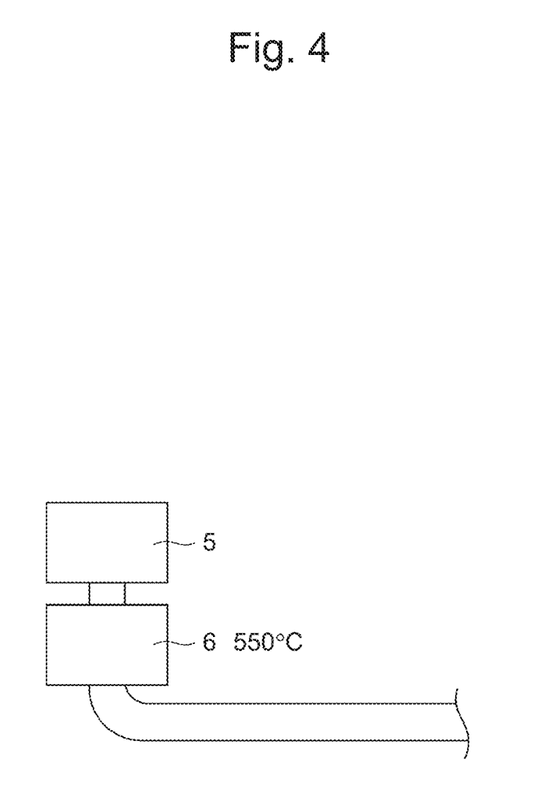
FIG. 4 is a drawing schematically illustrating an evaluation layout of an engine bench evaluation.

For the exhaust gas purification catalysts of Comparative Examples 1 and 2 and Example 1 that have undergone "3. Durability Test", emission behaviors of HC and NOx in the rich atmosphere were evaluated using an actual engine. FIG. 4 schematically illustrates an evaluation layout of the engine bench evaluation.

(1) First, an L-type four-cylinder engine 5 was started, and the engine condition was adjusted so as to have an inlet gas temperature at 550° C.

(2) Each of exhaust gas purification catalysts 6 was mounted to an exhaust system of the engine 5, and after being stabilized, the air-fuel ratio (A/F) was alternately switched between a condition (rich condition) of A/F 14.1 and a condition (lean condition) of A/F 15.1 at intervals of three minutes.

(3) After the third switching from A/F 15.1 (lean) to A/F 14.1 (rich), the HC and NOx emission behaviors for three minutes under the condition of A/F 14.1 were evaluated.

5. Result of Engine Bench Evaluation

Figure 5:
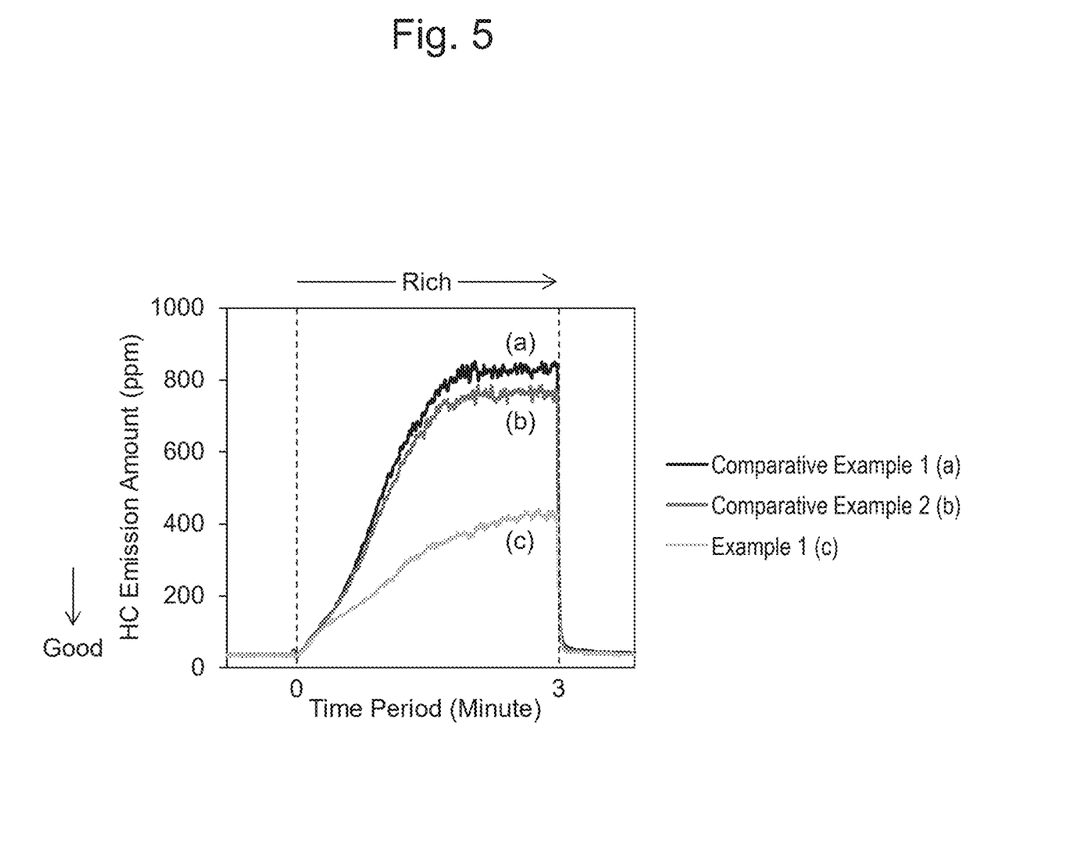
FIG. 5 is a graph illustrating a result of HC emission behavior in a rich steady state of the exhaust gas purification catalysts of Comparative Examples 1 (a) and 2 (b) and Example 1 (c)
Figure 6:
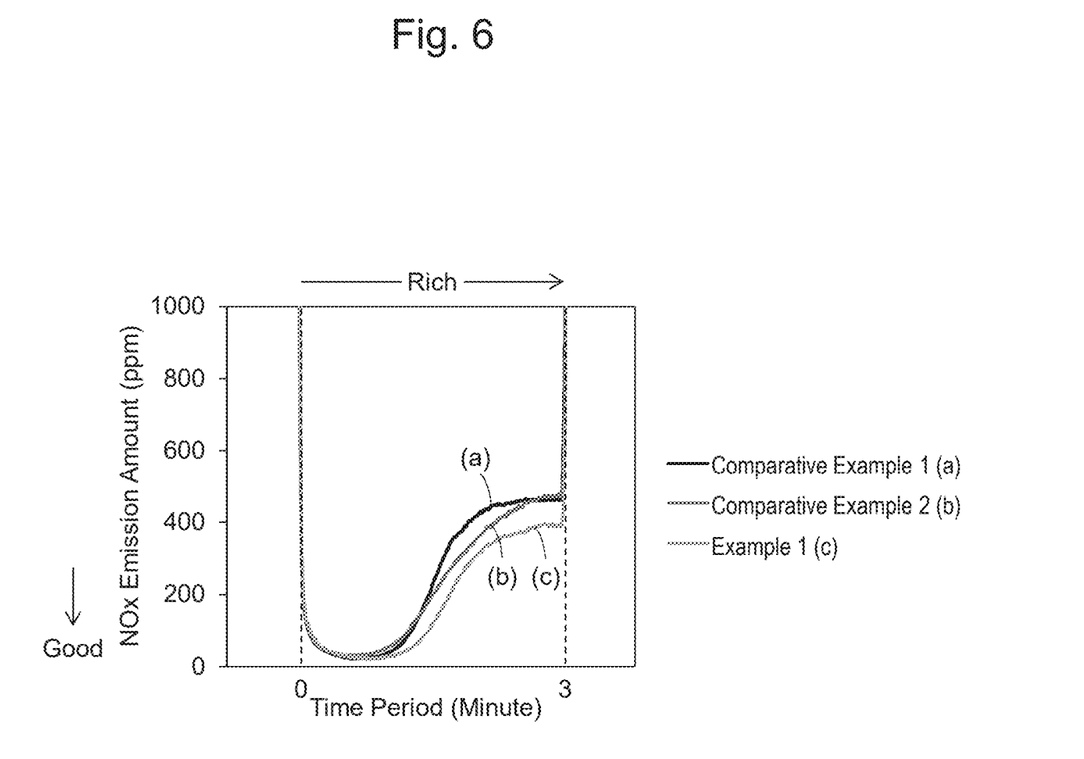
FIG. 6 illustrates a result of NOx emission behavior in a rich steady state of the exhaust gas purification catalysts of Comparative Examples 1 (a) and 2 (b) and Example 1 (c)

FIG. 5 illustrates the result of HC emission behavior in a rich steady state of the exhaust gas purification catalysts of Comparative Examples 1 (a) and 2 (b) and Example 1 (c), and FIG. 6 illustrates the result of NOx emission behavior in a rich steady state of the exhaust gas purification catalysts of Comparative Examples 1 (a) and 2 (b) and Example 1 (c).

It was found from FIG. 5 that the HC emission amount was significantly suppressed in Example 1 compared with Comparative Examples 1 and 2. The reason is considered that in Example 1, by supporting Pd close to the exhaust gas flow, that is, Pd disposed in the upper coating layer that the exhaust gas contacts at first on $Al_2O_3$, $Al_2O_3$ excellent in HC poisoning resistance suppressed the HC poisoning of Pd, and thereby usage efficiency of Pd was improved. The effect is considered to be provided even when Pt as a catalyst metal equivalent to Pd is used.

Further, it was found from FIG. 6 that the NOx emission amount was suppressed as well in Example 1 compared with Comparative Examples 1 and 2. The reason is considered that in Example 1, the improved HC conversion ability in the upper coating layer relatively suppressed the HC poisoning of Rh in the lower coating layer, and thereby the usage efficiency of Rh was improved. The effect is considered to be provided even when Rh is changed to another noble metal.

6. Evaluation of Ratio of Thicknesses of Upper Coating Layer to Thicknesses of Lower Coating Layer (Upper Coating Layer/Lower Coating Layer) in Exhaust Gas Purification Catalyst 6-1. Preparation of Exhaust Gas Purification Catalyst Example 2

The exhaust gas purification catalyst was prepared similarly to Example 1 except that the amount of $Al_2O_3$ on which Pd was supported was changed to 1.05 g (1.20 g/L) to obtain the thickness of the upper coating layer of 1 μm in Example 1 (5").

Example 3

The exhaust gas purification catalyst was prepared similarly to Example 1 except that the amount of $Al_2O_3$ on which Pd was supported was changed to 10.5 g (12.0 g/L) to obtain the thickness of the upper coating layer of 9.6 μm in Example 1 (5").

Example 4

The exhaust gas purification catalyst was prepared similarly to Example 1 except that the amount of $Al_2O_3$ on which Pd was supported was changed to 15.75 g (18.0 g/L) to obtain the thickness of the upper coating layer of 15.8 μm in Example 1 (5").

Comparative Example 3

The exhaust gas purification catalyst was prepared similarly to Example 1 except that the amount of $Al_2O_3$ on which Pd was supported was changed to 26.25 g (30.0 g/L) to obtain the thickness of the upper coating layer of 23.4 μm in Example 1 (5").

Comparative Example 4

The exhaust gas purification catalyst was prepared similarly to Example 1 except that the amount of $Al_2O_3$ on which Pd was supported was changed to 31.5 g (36.0 g/L) to obtain the thickness of the upper coating layer of 29.9 μm in Example 1 (5").

6-2. Evaluation

For the exhaust gas purification catalysts of Examples 1 to 4 and Comparative Examples 3 and 4, "3. Durability Test" and "4. Engine Bench Evaluation" were performed, and the HC emission amount and the NOx emission amount three minutes after switching to the rich atmosphere in "4. Engine Bench Evaluation (3)" were measured.

Figure 7:
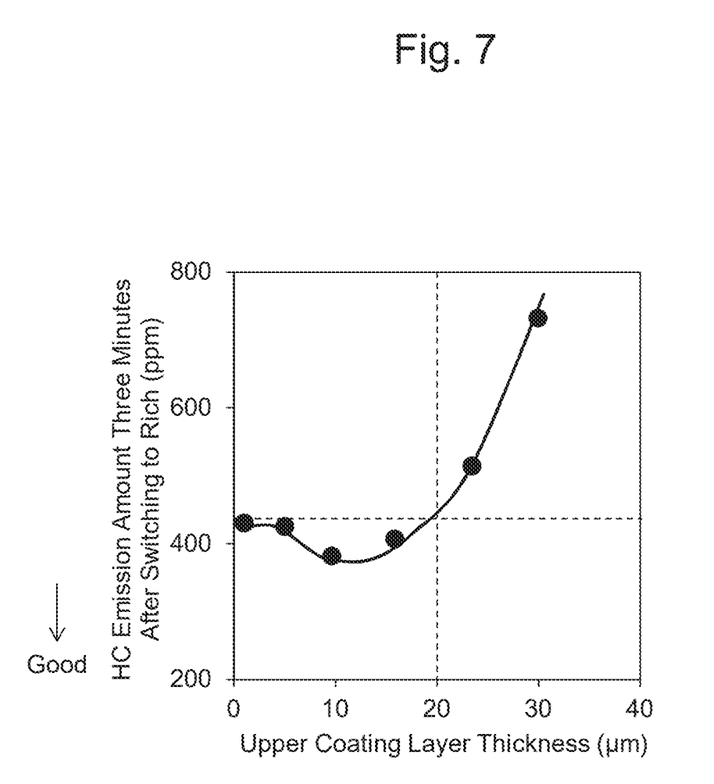
FIG. 7 is a graph illustrating a relation between a thickness of an upper coating layer and an HC emission amount three minutes after switching to a rich atmosphere for exhaust gas purification catalysts of Examples 1 to 4 and Comparative Examples 3 and 4.
Figure 8:
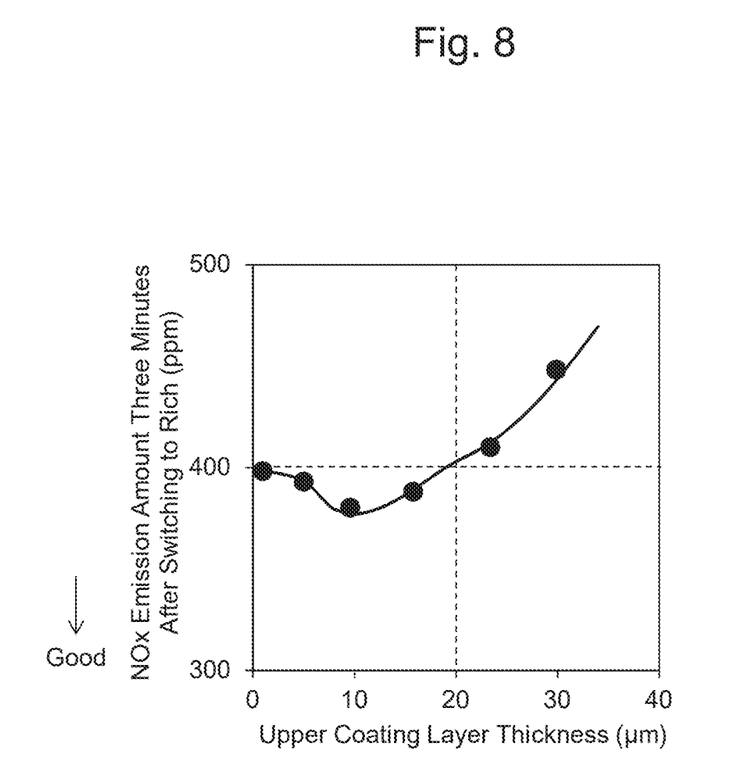
FIG. 8 is a graph illustrating a relation between the thickness of the upper coating layer and a NOx emission amount three minutes after switching to the rich atmosphere for the exhaust gas purification catalysts of Examples 1 to 4 and Comparative Examples 3 and 4.

FIG. 7 illustrates a relation between the thickness of the upper coating layer and the HC emission amount three minutes after switching to the rich atmosphere for the exhaust gas purification catalysts of Examples 1 to 4 and Comparative Examples 3 and 4. FIG. 8 illustrates a relation between the thickness of the upper coating layer and the NOx emission amount three minutes after switching to the rich atmosphere for the exhaust gas purification catalysts of Examples 1 to 4 and Comparative Examples 3 and 4.

It was found from FIGS. 7 and 8 that when the thickness of the lower coating layer of the exhaust gas purification catalyst was 100 μm, with the thickness of the upper coating layer of 20 μm or less, especially 1 μm to 16 μm in some embodiments, the HC emission amount and the NOx emission amount three minutes after switching to the rich atmosphere were both effective. Accordingly, it was found that in the exhaust gas purification catalyst of the present disclosure, when the ratio of the thickness of the upper coating layer to the thickness of the lower coating layer (upper coating layer/lower coating layer) was 0.2 or less, especially 0.01 to 0.16 in some embodiments, the HC conversion and the NOx conversion in the rich atmosphere were able to be efficiently performed.

All publications, patents and patent applications cited in the present description are herein incorporated by reference as they are.

What is claimed is:

1. An exhaust gas purification catalyst comprising:
   a substrate; and
   a catalyst coating layer coated on the substrate,
   wherein the catalyst coating layer comprises a lower coating layer coated on the substrate and an upper coating layer coated on the lower coating layer,
   wherein the lower coating layer contains a noble metal,
   wherein the upper coating layer contains Pd and/or Pt,
   wherein the Pd and/or Pt contained in the upper coating layer is supported on $Al_2O_3$ by 80 weight % or more of a total weight of the Pd and/or Pt contained in the upper coating layer,
   wherein the content of $Al_2O_3$ supporting Pd and/or Pt contained in the upper coating layer is 1.2 g to 18 g relative to the substrate capacity of 1 L, and
   wherein a ratio of a thickness of the upper coating layer to a thickness of the lower coating layer (upper coating layer/lower coating layer) is 0.2 or less.

2. The exhaust gas purification catalyst according to claim 1,
   wherein the Pd and/or Pt contained in the upper coating layer is supported on $Al_2O_3$ by 90 weight % or more of the total weight.

3. The exhaust gas purification catalyst according to claim 1,
   wherein the Pd and/or Pt contained in the upper coating layer is supported on $Al_2O_3$ by 95 weight % or more of the total weight.

4. The exhaust gas purification catalyst according to claim 1,
   wherein the thickness of the upper coating layer is 20 μm or less.

* * * * *